No. 712,945. Patented Nov. 4, 1902.
J. C. LOTTERHAND.
TYPE WRITER.
(Application filed July 17, 1901.)
(No Model.) 5 Sheets—Sheet 1.

Fig. 1

No. 712,945. Patented Nov. 4, 1902.
J. C. LOTTERHAND.
TYPE WRITER.
(Application filed July 17, 1901.)
(No Model.) 5 Sheets—Sheet 2.

Witnesses:
Harold G. Barrett
Louis B. Erwin

Inventor:
J. C. Lotterhand
By Rector & Hibben
his Attys

No. 712,945. Patented Nov. 4, 1902.
J. C. LOTTERHAND.
TYPE WRITER.
(Application filed July 17, 1901.)
(No Model.) 5 Sheets—Sheet 3.

Witnesses
Inventor

No. 712,945. Patented Nov. 4, 1902.
J. C. LOTTERHAND.
TYPE WRITER.
(Application filed July 17, 1901.)
(No Model.) 5 Sheets—Sheet 4.

No. 712,945. Patented Nov. 4, 1902.
J. C. LOTTERHAND.
TYPE WRITER.
(Application filed July 17, 1901.)
(No Model.) 5 Sheets—Sheet 5.

Witnesses
Harold H Barrett
Louis B. Erwin

Inventor:
J. C. Lotterhand
By Rector & Hibben
his Atty's

UNITED STATES PATENT OFFICE.

JASON C. LOTTERHAND, OF NEW YORK, N. Y., ASSIGNOR TO JOHN T. LANGHORNE, OF ST. LOUIS, MISSOURI, AND WALTER B. MANNY, OF NEW YORK, N. Y.

TYPE-WRITER.

SPECIFICATION forming part of Letters Patent No. 712,945, dated November 4, 1902.

Original application filed January 17, 1901, Serial No. 43,599. Divided and this application filed July 17, 1901. Serial No. 68,697. (No model.)

*To all whom it may concern:*

Be it known that I, JASON C. LOTTERHAND, a citizen of the United States, residing at the city of New York, in the county of New York and State of New York, have invented certain new and useful Improvements in Type-Writers, of which the following is a description, reference being had to the accompanying drawings, forming a part of this specification.

The present application is a division of an application, Serial No. 43,599, filed by me on January 17, 1901, for improvements in typewriting machines and adding attachments therefor.

The subject-matter of the present application consists of certain improvements in the paper-carriage and associated mechanism of the type-writing machine, all of which will be hereinafter more fully described, and particularly pointed out in the claims.

In the accompanying drawings, Fig. 2ª, a sectional detail of one of the bearing-rollers of the paper-carriage; Fig. 2ᵇ, a perspective of the signal-bell and attendant parts.

The same figures of reference are used to indicate identical parts in the several views.

Figure 1:
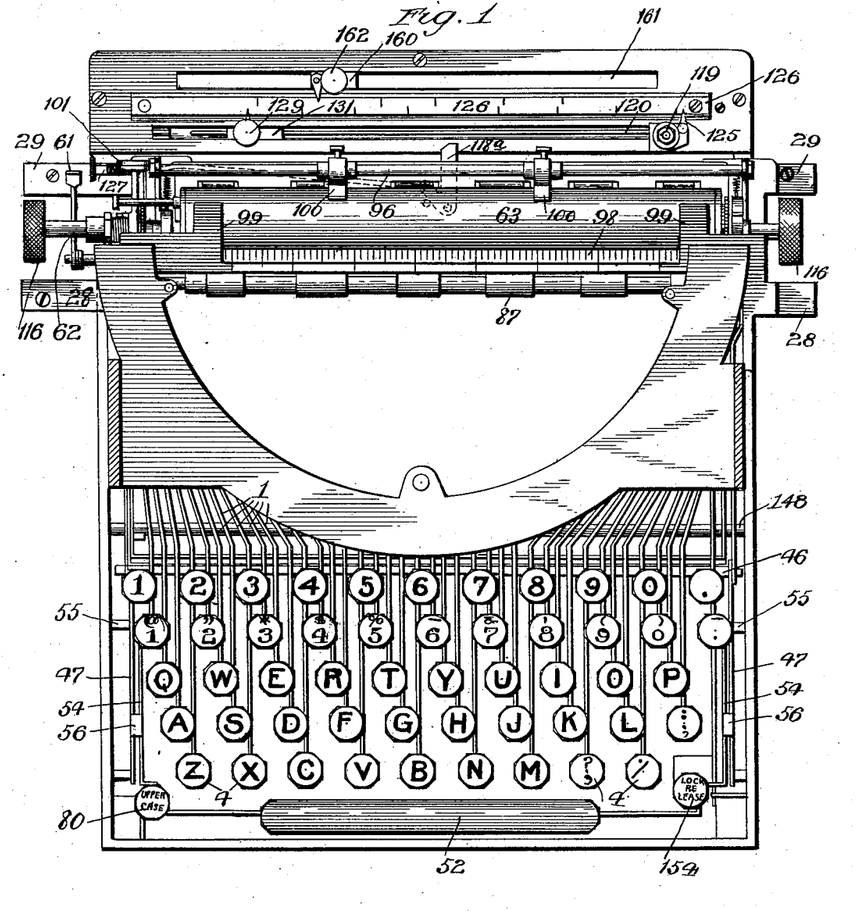
Figure 1 is a top plan view of the machine, exhibiting such parts thereof as relate to the subject-matter of the present application.
Figure 2:
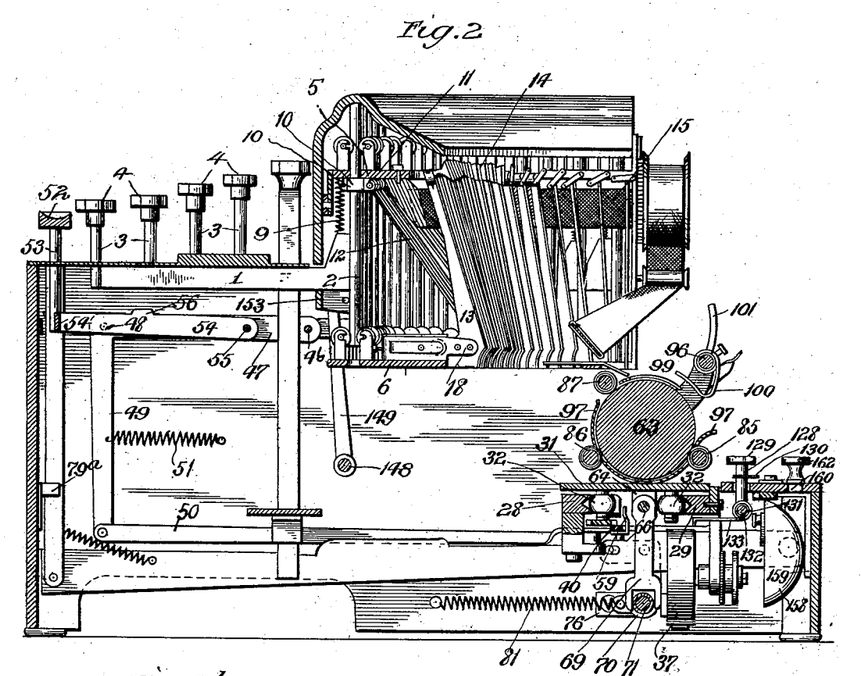
Fig. 2 is a middle vertical section of the same.
Figure 2A:
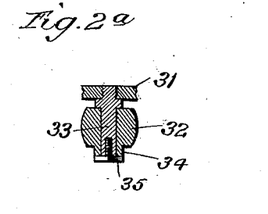
Figure 2B:
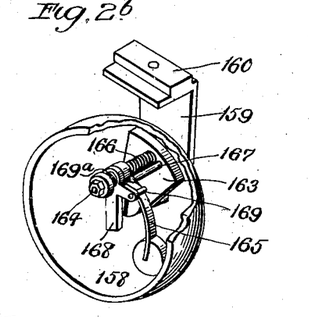

The operating type-keys of the machine consist of thin arms or plates 1, rigidly secured at their rear ends to vertically-sliding rods 2, Fig. 2, and having secured to their front ends vertical stems 3, passing upward through and loosely guided in apertures in the forward top plate of the machine and carrying at their upper ends the usual key-buttons 4, Fig. 1. The rods 2 are arranged in a semicircle in front of and concentric to the printing-point and are guided at their upper and lower ends in suitable bearings upon the frame-plates 5 and 6. Coiled springs 9, connected at their lower ends to the key-plates 1 and at their upper ends to the under side of the frame-plate 5, yieldingly hold the rods 2 in elevated position and serve to return them thereto after depressions of the keys. Secured upon the rods 2 are collars 10, provided upon their rear or inner sides with ears 11, projecting radially toward the printing-point, to which ears are connected the upper and outer ends of wires or rods 12, whose lower or inner ends are connected to the type-bars 13. These type-bars are pivotally supported at their lower ends, concentric to the printing-point, in hangers 18 upon the frame-plate 6 and carry at their upper ends the usual type-blocks 14, bearing upper and lower case type characters. A depression of the rods 2 causes the type-bars to be swung inward and downward and their type brought into contact with the upper side of the platen-roller 63 at the printing-point, while the return of the parts by the springs 9 restores the type-bars to their normal position, where they rest against a suitable semicircular support 15, secured to and depending from the frame-plate 5.

The foregoing is the key and type-bar mechanism illustrated in the drawings; but, so far as the subject-matter of my present application is concerned, any other suitable mechanism may be employed.

Figure 3:
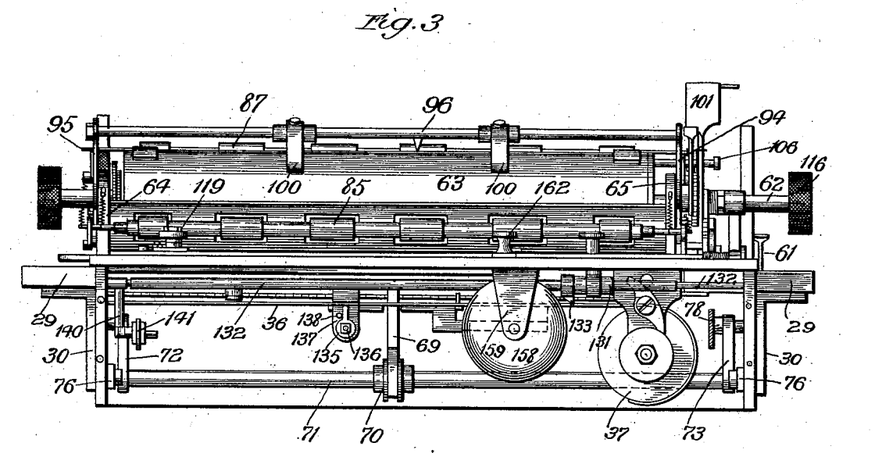
Fig. 3, a rear elevation of the lower part of the machine.
Figure 4:
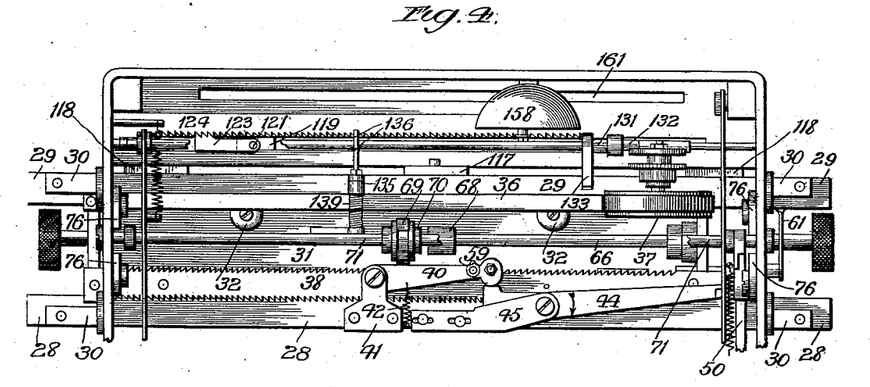
Fig. 4, a bottom plan view of the rear part of the machine.
Figures 7, 8, 9, 10:
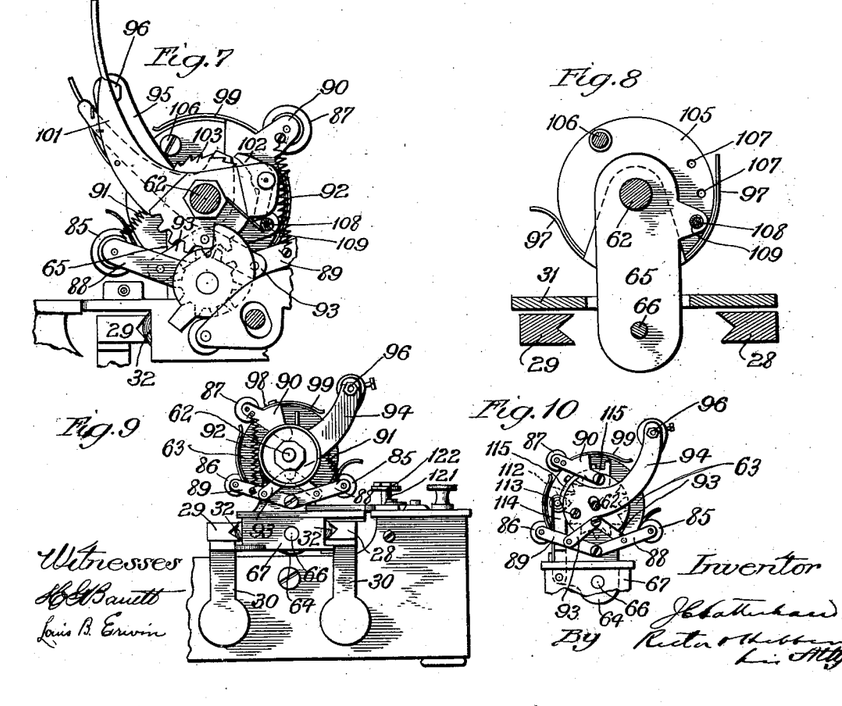
Fig. 7, an elevation of the parts at the left hand of Fig. 6.
Fig. 8, a sectional detail in a vertical plane at the left-hand end of the platen-roller.
Fig. 9, a detail of the parts at the right-hand end of the platen-roller.
Fig. 10, a corresponding view with the milled thumb-piece on the spindle of the platen-roller removed to expose the parts behind it.

The paper-carriage is supported and travels transversely of the machine upon two grooved bars or rails 28 29, Figs. 1, 2, 3, 4, 9, 11, and 12, suitably supported near their outer ends upon the side plates of the main frame of the machine—in the present instance by brackets 30, secured to said side plates and projecting outwardly at right angles at their upper ends, Figs. 3, 4, and 9. As shown in Fig. 2, the base-plate 31 of the paper-carriage, upon which the various parts of the carriage are mounted, is provided upon its under side with depending studs carrying antifriction-rollers 32, engaging the V-shaped grooves on the inner sides of the supporting-rails 28 29. The exact construction of the studs and rollers is shown in detail in Fig. 2$^a$, where it will be seen that each stud is provided slightly below the plate 31 with an annular shoulder, formed by the portion of the stud below such shoulder being reduced in diameter to receive the roller 32, which latter in order to provide a long bearing has depending from its under side a hub or sleeve 34, which extends downward approximately but not quite to the lower end of the stud. The stud has a screw-threaded hole tapped in its lower end to receive a screw 35, whose head seats tightly against the lower end of the stud, the slight projection of latter below the roller 32 or its hub leaving the roller free to turn upon the stud, while preventing any loose play of it thereon. There are four of these rollers 32 supporting the paper-carriage upon the grooved rails 28 29, of which the two rollers engaging the rail 29 are shown in Fig. 4, the rollers engaging the rail 28 being located immediately opposite those shown in Fig. 4, as indicated in Fig. 2. These rollers 32, supporting the paper-carriage upon the grooved rails 28 29, afford antifriction-bearings for the carriage practically as efficient as ball-bearings and obviate the necessity of providing means for retaining the balls in position transversely of the machine. The rollers 32 may also be ground to exact size, which is not true of ordinary ball-bearings, and their long bearings upon the studs 33 serve to hold them in true position and accurately guide the paper-carriage in its movements transversely of the machine.

Figure 5:
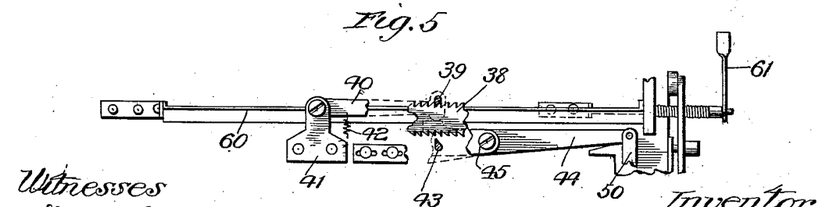
Fig. 5, a detail from Fig. 4.

Before proceeding to describe in detail the paper-carriage and associated parts I will explain the novel escapement of my machine, which is applicable to any form and construction of paper-carriage. The paper-carriage is drawn toward the left, as usual, by a metal strap 36, secured at its right-hand end to the right-hand end of the paper-carriage and wound at its left-hand end upon a spring-drum 37, Figs. 2, 3, and 4. Secured to the under side of the paper-carriage is the ratchet-bar 38, Figs. 4 and 5, provided with teeth upon both of its sides or edges. Those upon the rear side of the bar coöperate with the pallet tooth or dog 39, carried by one end of an arm or lever 40, which is pivoted at its opposite end to a bracket-support 41, secured to the under side of the forward guide-rail 28, heretofore described, and has connected to it a coiled spring 42, which pulls its free end toward the ratchet-bar and normally holds the tooth 39 in engagement therewith, as in Fig. 5. The teeth upon the opposite or forward side of the ratchet-bar are adapted to coöperate with a second pallet tooth or dog 43, carried by a lever 44, pivoted between its ends to a bracket-support 45, also secured to the under side of the guide-rail 28 and having its end which carries the tooth 43 shaped to coöperate with the correspondingly-shaped end of the arm 40, carrying the tooth 39, as shown in Fig. 4. When the tooth 39, carried by the arm 40, is in engagement with the ratchet upon the rear side of the bar, as in Figs. 4 and 5, the tooth 43 is held out of engagement with the ratchet on the forward side of the bar both by reason of the contact of the end of the arm 40 with the end of the lever 44 and by the action of a spring upon parts connected to the lever 44 and hereinafter described; but when the outer end of the lever 44 is swung forward and its inner end rearward the tooth 43 will be engaged with the forward ratchet and the arm 40 will be swung rearward and its tooth 39 be disengaged from the rear ratchet. When the lever 44 is then released and returned to normal position and the spring 42 permitted to swing the arm 40 forward again, the tooth 39 will move into the path of the next succeeding tooth upon the rear side of the ratchet-bar and permit the paper-carriage to be advanced by its spring until such succeeding tooth contacts with and is arrested by the tooth 39. This result is accomplished and the tooth 39 prevented from reëngaging the same tooth of the ratchet with which it had been previously engaged, and thereby holding the paper-carriage from any movement at all, by setting the pallet-tooth 43 slightly in advance of the tooth 39 with respect to the ratchet-teeth with which they coöperate, so that when the lever 44 is vibrated to disengage the tooth 39 from the rear ratchet and engage the tooth 43 with the forward ratchet the paper-carriage and ratchet-bar will be permitted a slight movement intermediate the disengagement of the tooth 39 and the arrest of the parts by the tooth 43. This movement thus permitted, the ratchet-bar and paper-carriage may be so slight as to be scarcely perceptible to the eye in slowly operating and examining the machine, (and much too slight to be indicated in the drawings,) such movement being less than a one-half letter-space, and yet be amply sufficient to prevent reëngagement of the tooth 39 with the same tooth of the ratchet with which it had been previously engaged. To provide for adjustment of the pallet-tooth 43, the tooth may either be adjustably mounted upon the lever 44 or the bracket-support 45 of said lever may be adjustably secured to the under side of the rail 28, as indicated. The lever 44 is vibrated back and forth at each operation of the machine to permit the paper-carriage to advance one step by a connection (shown in Fig. 12) with a universal rod or bar 46 underlying the type-keys 1, Figs. 1 and 2, and hung by forwardly-extending side arms 47 upon studs 48 upon the side frames of the machine, Figs. 11 and 12. The left-hand one of these arms 47, Fig. 12, has a depending extension 49 at its forward end, forming a bell-crank of the two arms, to the lower end of which arm 49 is connected the forward end of a link 50, which is pivoted at its rear end to the outer end of the lever 44. When any one of the type-keys, Fig. 2, is depressed, its plate 1 as the key approaches the limit of its downward movement will contact with and depress the universal rod 46, thereby rocking the bell-crank and drawing forward the link 50, connected to the outer end of the escapement-lever 44, Fig. 4, which will throw the inner end of said lever rearward and disengage the tooth 39 from the rear ratchet and engage the tooth 43 with the forward ratchet, and when the key is released a spring 51, connected to the depending arm 49 of the bell-crank, Figs. 2 and 12, will return the universal bar 46 and the escapement-lever 44 to normal position, disengaging the tooth 43 from the forward ratchet and permitting the spring 42 to reengage the tooth 39 with the rear ratchet and the paper-carriage to advance one step, as before explained. The supporting side arms 47 of the universal rod 46 are provided a short distance forward of said rod with vertical slots fitting over studs 55, projecting inward from the side frames of the machine, the engagement of which slots with said studs serves to limit the vertical movement of the rod 46.

The escapement mechanism above described is simple, efficient, and durable and embodies the advantages of obviating the employment of the spring-actuated movable pallet or loose dog common to most type-writer escapement mechanisms. The elimination of such spring-actuated movable pallet or loose dog and the employment of two rigid dogs instead not only simplifies and cheapens the construction and lessens wear and liability of the escapement mechanism to get out of order, but it permits the paper-carriage when set by hand to any exact point upon the scale and then released to remain at that exact point instead of moving forward one space, as where a loose dog is employed. In my improved machine the paper-carriage may be moved to any desired point upon the scale and released and it will remain at that exact point, which materially facilitates adjustments of the carriage to desired positions in practical use.

Figure 11:
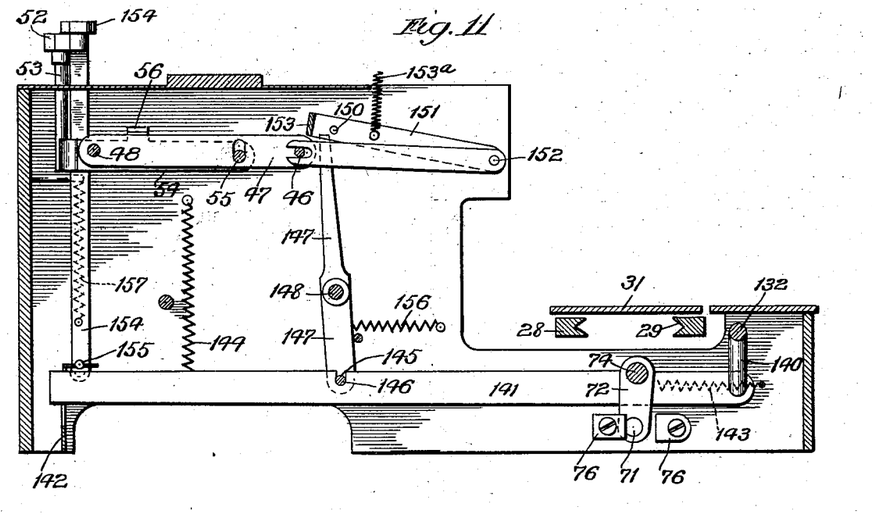
Fig. 11, a vertical section taken on a line immediately within the right-hand side frame of the machine.
Figure 12:
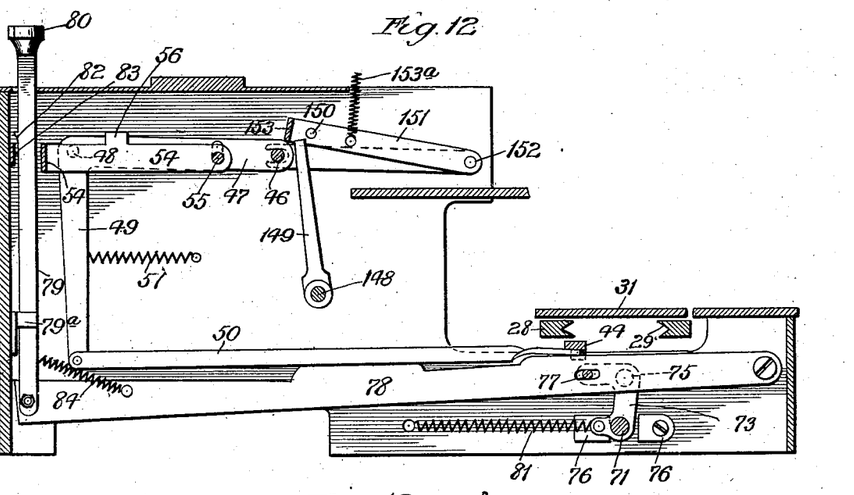
Fig. 12, a corresponding view immediately within the left-hand side frame of the machine, and Fig. 13 a detail from Fig. 12.

The space-bar 52 of the machine, Fig. 1, is supported by two vertically-depending stems 53, Figs. 2 and 11, secured at their lower ends to a bail 54, whose rearwardly-extending side arms are pivoted at their rear ends upon the studs 55, Figs. 11 and 12, and provided with outwardly-projecting lugs 56, overlapping the side arms 47, Fig. 1, so that whenever the space-bar is depressed the bell-crank 47 49, Fig. 12, will be rocked, as by depression of one of the type-keys before described, and the lever 44 consequently vibrated to operate the escapement mechanism and advance the paper-carriage one step. The front end of the bail 54 is pressed upward and yieldingly supported by a suitable spring. (Not shown.)

For the purpose of holding the pallet-tooth 39 entirely out of engagement with the ratchet-bar 38 to permit the paper-carriage to be shifted back and forth independently of the escapement mechanism when desired the arm 40, carrying the tooth 39, has secured to it an upwardly-projecting finger 59, Figs. 2 and 4, which projects upwardly behind a swinging release-bar 60, Fig. 5, pivotally supported by side arms at its opposite ends and adapted to be swung rearward to disengage the tooth 39 from the ratchet-bar 38 by a release-lever 61, Figs. 1, 4, and 5.

Figure 13:
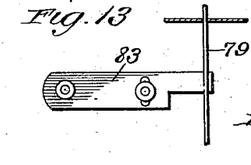

Returning now to the paper-carriage and associated parts, the spindle 62 of the platen-roller 63 has its bearings near its opposite ends in arms 64 65, Figs. 2, 3, 6, 7, 8, 9, and 10, secured to and projecting upwardly from a rock-shaft 66, having bearings at its opposite ends in depending end plates 67, secured to the under side of the main plate 31 of the paper-carriage, Figs. 2, 4, 8, and 9, and also a middle bearing 68, Fig. 4, formed upon the under side of the plate 31. Fast upon and depending from the rock-shaft 66, near the middle of the machine, is an arm 69, Figs. 2, 3, and 4, provided with a forked lower end engaging a circumferentially-grooved collar 70, mounted to slide upon a rod 71, constituting part of a swinging bail composed of said rod and two arms 72 73, secured to the opposite ends of said rod, Figs. 11 and 12, and hung at their upper ends upon studs 74 75 upon the inner sides of the side plates of the main frame of the machine. The rod 71 projects at its opposite ends beyond its supporting-arms 72 73, and said projecting ends coöperate with stop-plates 76 upon the side frames to limit the swinging movement of the rod and bail, Figs. 2, 4, 11, and 12. The left-hand supporting-arm 73 of the rod 71, Fig. 12, is extended forwardly of its supporting-stud 75 to form a bell-crank and is provided with a laterally-projecting stud 77, engaging a slot in the lever 78 of the shift-key, said lever having pivoted to its front end a vertically-extending key-stem 79, provided at its upper end with a finger-button 80, marked "Upper case," Fig. 1. Whenever the shift-key is depressed the bell-crank will be rocked and the rod 71 swung rearwardly into contact with the rear stops 76, with the result that the platen-roller 63 will be swung forward to cause the upper-case characters upon the type-blocks to strike the platen-roller at the printing-point. A coiled spring 81, Figs. 2 and 12, serves to return the parts to normal position when the shift-key is released and yieldingly hold them therein, and an angle-plate 79ᵃ, secured to the inner side of the front frame-plate, Figs. 2 and 12, holds the lower end of the key 79 and front end of the lever 78 from lateral movement. The slot in the top plate of the casing, through which the upper end of the shift-key 79 projects, Fig. 12, is of sufficient length to permit slight forward-and-backward play of the upper end of the key, and the key is provided upon its forward edge with a beveled tooth or shoulder 82, adapted to coöperate with a catch-piece 83, secured to the front wall of the casing. A coiled spring 84, connecting the shift-key 79 with the shift-lever 78, near their lower and forward ends, yieldingly holds the upper end of the shift-key 79 in rearward position and causes it to reciprocate vertically against the rear wall of its slot in the top plate of the casing, under which condition the tooth 82 on the key travels freely past the catch-piece 83. When, however, it is desired to temporarily lock the platen-roller in position for the printing of upper-case characters, it is simply necessary to pull forward the upper end of the shift-key 79 as it is depressed, whereupon on the release and first upward movement of the key its tooth or shoulder 82 will engage the under side of the catch-piece and prevent the return of the key to normal position, thereby locking the platen in shifted position. When it is desired to resume the printing of lower-case characters, it is simply necessary to press the upper end of the shift-key 79 rearward, whereupon the spring 81 will restore the parts to normal position. To facilitate assemblage of the parts and enable the catch-piece 83 to be readily located at the proper point, the catch-piece is adjustably secured to the front plate of the framework or casing, as shown in Fig. 13.

Coöperating with the platen-roller 63 are three feed-rollers 85 86 87, Fig. 2, journaled at their opposite ends in the outer extremities of arms 88 89 90, which are pivoted at their inner ends to the supporting side arms 64 65 of the platen-roller, Figs. 3, 7, 9, and 10. Coiled springs 91 92, connected to the arms 88 89 90, serve to yieldingly hold the rollers 85 86 87 in contact with the platen-roller. Pivoted to the arms 88 and 89, intermediate their ends at each end of the platen-roller, Figs. 7, 9, and 10, are the lower outer ends of two links or arms 93, pivotally connected together at their upper inner ends and constituting toggles whose knuckles bear against or rest immediately beneath the lower edges of levers 94 95, which, as shown in Fig. 10, are pivoted to the platen-supporting arms 64 and 65 at points in front of the axis of the platen and provided with holes for the passage of the platen-spindle 62 sufficiently large to permit slight rocking movement of the levers. The upper rear ends of the two levers are connected by the transverse rod or paper-release bar 96, Figs. 1, 2, 3, and 6. It will be apparent from Figs. 9 and 10 that when the upper rear end of the lever 94 is swung rearward and downward by pressing upon the rod or bar 96, the knuckle of the toggle 93 will be forced downward and the rollers 85 86 pressed away from the platen-roller, while the upwardly-extended forward end of the lever 94 will engage the arm 90 and press the roller 87 away from the platen-roller. By simply pressing upon the paper-release rod or bar 96, therefore, all three of the feed-rollers may be moved away from the platen-roller to release the paper and facilitate its adjustment about the platen-roller. The lower half and forward side of the platen-roller are surrounded by a curved paper-guide 97, Fig. 2, having an outwardly-curved rear edge to facilitate the insertion of the paper and provided with openings to permit the rubber-faced sections of the feed-rollers 85 and 86 to bear against the platen-roller, Fig. 3. This paper-guide 97 conducts the paper from its point of insertion to and beneath the upper feed-roller 87, from which roller the paper passes on beneath the scale-bar 98, Figs. 1, 2, and 6, which serves as a further guide for the paper to hold it against the platen-roller and is provided at its opposite ends with rearwardly-extending curved fingers 99, Fig. 6, which serve to hold the opposite edges of the paper against the platen-roller during the passage of the paper over the top of said roller. From the platen-roller the paper passes beneath curved guide-fingers 100, secured to the rod 96, and thence out of the machine. The scale-bar 98 instead of being mounted in fixed position upon the paper-carriage, as usual, is supported by and has its opposite ends secured to the pivoted arms 90, which carry the upper feed-roller 87, Figs. 6, 7, 9, and 10, with the result that whenever the release-bar 96 is pressed rearward and downward to separate the feed-rollers from the platen-roller and release the paper, as before described, the scale-bar 98 will be thrown rearward upon the platen-roller a slight distance, owing to the upward and rearward movement given the arms 90 and roller 87 by the contact of the upper forward ends of the levers 94 and 95 with the arms 90, Figs. 9 and 10. By thus movably mounting the scale-bar 98, and so connecting it with the paper-releasing device as to cause it to be moved toward the printing-line whenever said device is operated to release the paper, I am enabled to set the scale-bar nearer the printing-line than has heretofore been the practice in shift-carriage or double-case machines and to consequently utilize it to hold the paper against the platen-roller at a point nearer the printing-line than heretofore. In machines of this class it is necessary that the scale be located at a sufficient distance from the printing-line to be out of the path of the upper-case type characters when the platen-roller is in normal or unshifted position. Thus in my machine, in which the platen-roller is shifted forward for the printing of upper-case characters and the upper-case characters are consequently located upon the lower and forward ends of the type-blocks, it is essential that the scale-bar be located sufficiently forward of the printing-line to escape the upper-case characters upon the type-blocks when the latter are thrown downward to cause their lower-case characters to strike the platen in its normal or unshifted position. It is also necessary, or at least highly desirable, in all type-writers to locate the scale-bar at such distance from the principal line that when a printed line upon the sheet is moved to position immediately adjacent the scale-bar (preparatory to the correction of an error or after the reinsertion of a partially-printed page or otherwise) such printed line may be turned forward to the printing-line by turning forward the platen one or more full steps or line-spaces. Inasmuch as the scale-bar cannot be located in fixed position relatively to the platen at the distance of a single line or space from the printing-line without bringing it into the path of the upper-case characters, it has heretofore been the practice in shift-carriage or double-case machines to locate the scale-bar two full-line spaces from the printing-line, with the result that the paper cannot be held against the platen by the scale-bar at a point nearer the printing-line than such two full-line spaces. The paper, particularly in manifolding operations, thus has a greater opportunity to puff up or spring away from the platen than if it were firmly held against the platen by the scale-bar at a point nearer the printing-line. In my machine I locate the scale-bar at just a sufficient distance forward of the printing-line to remove it from the path of the upper-case type characters when the platen is in its normal or rearward position, and by means of its connection with the paper-release bar I throw it forward to a point exactly one line-space from the printing-line whenever the release-bar is operated to release the paper preparatory to adjusting it about the platen-roller. During the time the paper is being adjusted, therefore, the scale-bar is removed but a single line-space from the printing-line, with the result that after the paper has been adjusted with the printed line immediately adjacent the scale-bar and the release-bar released and the scale moved forward to its normal position again the printed line may be advanced to the printing-line by turning the platen-roller a single step, while during the printing operation the scale-bar, holding the paper firmly against the platen at a point but slightly more than one line-space removed from the printing-line, serves to hold the paper against the platen at the printing-line more uniformly and effectively than where it is located at a greater distance from the printing-line, as heretofore.

Figure 6:
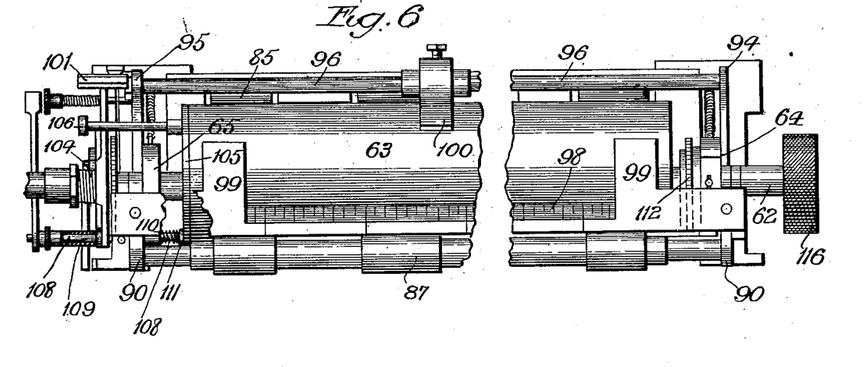
Fig. 6, an enlarged top plan view of the platen-roller and associated parts, with the middle portion thereof broken away.

The platen-roller is turned in ordinary line-spacing by means of a lever 101, Figs. 1, 2, 3, 6, and 7, mounted upon the left-hand end of the platen-roller spindle 62 and carrying a pawl 102, coöperating with a ratchet 103, fast upon said spindle, Fig. 7. A spring 104 wound around said spindle, Fig. 6, beside the lever 101 and secured at one end to said lever and at its opposite end to a fixed point yieldingly holds the lever in its normal position and returns it thereto after its upper end has been pressed rearward to turn the platen. For the purpose of regulating the movement of the lever 101 for single, double, or triple line spacing the following provision is made: Loosely mounted upon the platen-roller spindle, immediately adjacent the left-hand end of said roller, is a circular disk 105, Figs. 6, 7, and 8, which carries an outwardly-projecting stop-rod 106. This rod 106 serves to limit the rearward movement of the lever 101 in turning the platen, the upper edge of the forwardly-projecting end of the lever contacting with said stop-rod at the end of the movement of the lever, Fig. 7. At a point some distance forward of the rod 106 the disk 105 is provided with three holes 107, Fig. 8, with which coöperates a spring-pressed sliding catch-rod 108, mounted in a tubular guide or housing 109, secured to and projecting outwardly from the supporting-arm 65 of the platen-roller, Fig. 6. Surrounding this sliding rod 108, between the arm 65 and disk 105, is a coiled spring 110, Fig. 6, confined upon the rod by a collar 111, secured upon the rod near its inner or right-hand end, and serving to press the rod toward the right and engage its right-hand end with the holes in the disk 105. By withdrawing the rod 108 to the left and disengaging its right-hand end from the disk 105 the latter may be turned forward or backward by the rod 106 as a handle to thereby adjust said rod 106 to different positions for contact with the forward end of the lever 101, as described, and be then locked in adjusted position by releasing the rod 108 and permitting its spring 110 to reëngage its inner end with one of the holes in the disk 105. The tubular housing 109 for the sliding rod 108 itself serves in the present instance as a stop for limiting the forward movement of the lever 101 under the stress of its spring 104, Fig. 7, and as this stop is located in fixed position upon the platen-supporting arm 65, while the stop-rod 106 is adjustable relatively thereto in the manner described, it will be seen that the throw of the lever 101 may be regulated at will for single, double, or triple line spacing. Under the adjustment shown in the drawings the parts are set for triple-line spacing; but by turning the disk 105 forward, Fig. 7, and engaging the rod 108 with the middle hole 107 they will be set for double-line spacing, and so on. Other parts operated by and coöperating with the lever 101 are shown in Figs. 6 and 7; but they relate to the adding mechanism of the machine and need not be here described.

Secured to the platen-roller spindle 62, at the right-hand end of the roller, Fig. 6, is a star-toothed alining-wheel 112, with which cooperates a roller 113, Fig. 10, carried by a spring-pressed arm 114, pivoted at its lower end to the platen-supporting arm 64. Mounted upon the curved upper edge of the arm 64 is a sliding disengaging piece 115, having a beveled lower and forward end adapted to be forced between the forward side of the arm 64 and a stud upon the outer side of the arm 114 when said sliding piece is pressed forward by pressure against its upturned rear end, with the result of disengaging the roller 113 from the wheel 112, and thereby leaving the platen-roller free to be turned in either direction to any desired position by means of the milled thumb-pieces 116 upon the opposite ends of its spindle. The pawl 102, carried by the lever 101 at the opposite end of the platen-roller, is normally disengaged from the ratchet 103 upon the spindle of the roller, Fig. 7, and moves into engagement with the ratchet only when the lever 101 is operated, so that it does not interfere with the turning of the platen-roller in either direction when the roller 113 is disengaged from the alining-wheel 112, as described.

The extreme limit of movement of the paper-carriage in both directions transversely of the machine is determined by a fixed stop 117, Fig. 4, secured to the rear side of the bar or rail 29 and coöperating with suitable projections or contact-surfaces 118 upon the rear side of the paper-carriage at its opposite ends. Within these limits the movement of the paper-carriage toward the right is regulated by an adjustable marginal stop and toward the left by an automatic locking device, which automatically locks the machine from operation when the end of the line of desired length is reached. The marginal stop, which coöperates with a contact-piece 118ª, projecting from the rear side of the paper-carriage, is shown at 119 in Figs. 1 and 3, where it will be seen that it is guided in and adapted to travel longitudinally of a slot or guideway 120 in the rear top plate of the framework. This stop has journaled in it a vertical pin 121, Fig. 9, provided at its upper end with a thumb-piece 122 for turning it and carrying at its lower end, beneath the top plate of the framework, a toothed arm or catch-piece 123, coöperating with a ratchet-bar 124 upon the under side of the frame-plate, Fig. 4. A spring (not shown) coiled around the stem 121 serves to yieldingly hold the catch-piece 123 in engagement with the ratchet 124. By turning the thumb-piece 122 the catch 123 may be disengaged from the ratchet 124 and the stop adjusted in either direction to the point desired, a pointer 125 projecting from the stop over a scale-bar 126, Figs. 1 and 2, serving to determine the desired adjustment of the stop. To permit the paper-carriage to be moved to the right beyond the point determined by the marginal stop 119 without readjusting said stop whenever desired, the contact-piece 118ª is movably mounted upon the paper-carriage and arranged to be swung out of line with the stop 119. To this end it is made of approximately bell-crank form, as indicated by the dotted lines in Fig. 1, and pivoted upon the base-plate 31 of the paper-carriage, and has connected to its inner or left-hand end the right-hand end of a spring-pressed disengaging rod 127, provided with a thumb-piece at its left-hand end, by means of which the rod may be pressed toward the right to swing the contact-piece 118ª inward out of line with the stop 119 when it is desired to move the carriage to the right beyond said stop. The spring surrounding the rod 127 returns it and the contact-piece 118 to normal position when released.

Projecting upward through the slot or guideway 120, toward the left-hand end of the latter, is a hollow stem 128, Fig. 2, provided with a pointer 130, projecting over the scale-bar 126 and secured at its lower end to a sleeve 131, mounted to slide longitudinally upon a rock-shaft 132, journaled at its opposite ends in the side frame of the machine, Figs. 3 and 4. Passing through the hollow stem 128 and sleeve 131 and threaded in one of them is a set-screw 129, having a milled thumb-piece at its upper end and adapted to impinge against the shaft 132, by means of which the sleeve 131 may be secured to the shaft in different positions longitudinally thereof. Secured to and projecting forwardly from this sleeve 131 is a finger 133, Figs. 2, 3, and 4, whose front end is bent downward into the path of travel of a trip 135, Fig. 3, mounted upon a rod or pin 136, supported in and projecting rearwardly from a depending bracket 137, secured to the under side of the base-plate 31 of the paper-carriage. This trip 135 is free to turn upon the pin 136 in one direction; but its movement thereon in the opposite direction is limited by contact with a suitable pin 138, also secured in and projecting rearwardly from the depending bracket 137, and it is yieldingly held in normal position against said stop-pin by a spring 139, wound around the pin 136 and secured at one end thereto and at its opposite end to the trip 135, Fig. 4. The sleeve 131, which carries the finger 133, projecting into the path of the trip 135, is splined upon the rock-shaft 132, so that when the trip 135 contacts with the downwardly-projecting front end of the finger 133 and lifts the latter in the movement of the paper-carriage toward the left the shaft 132 will be rocked by the movement thus given to the finger 133. As seen in Fig. 11, the rock-shaft 132 is provided near its right-hand end with a depending arm or crank 140, to whose lower end is pivoted the rear end of a forwardly-extending bar or plate 141, whose extreme forward end fits in a vertical slot in a guide-plate 142, secured to the frame of the machine. A coiled spring 143, connected to the bar 141 near its rear end, yieldingly holds said bar in its rearward position, with the rock-shaft 132 in normal position and the finger 133 in the path of the trip 135, while a spring 144, connected to the bar 141 near its forward end, yieldingly holds the forward end of said bar in elevated position. At a point slightly forward of its middle the bar 141 is provided with a notch 145, in which fits a stud 146 upon the lower end of a lever 147, supported near its middle upon a rock-shaft 148, extending entirely across the machine, Fig. 1, and journaled at its opposite ends in the side frames thereof. The rock-shaft 148 is provided at the opposite side of the machine with an upwardly-extending arm 149, corresponding to the arm of the lever 147 above said rock-shaft, Figs. 11 and 12, and the upper ends of these arms 147 and 149 are adapted to coöperate with studs 150, projecting inward from the side arms of a bail 151, pivoted to the side frames of the machine at 152 and having its front cross-bar 153 held up beneath the type-keys 1, Figs. 1 and 2, by a spring 153ª, Figs. 11 and 12. When the upper ends of the arms 147 and 149 are swung rearward beneath the studs 150, they lock all of the type-keys from operation, and this movement is given said arms through the connections described whenever the paper-carriage in its travel toward the left brings the trip 135 into contact with the downwardly-bent front end of the finger 133 and lifts the latter, and thereby rocks the shaft 132, as described. The finger 133 may be adjusted along the rock-shaft 132 to any position desired, and the machine will become automatically locked in the manner described whenever a line of corresponding length is completed. For the purpose of unlocking the keys when they have become automatically locked in the manner and by the means just described, so as to permit the carriage to move still farther to the left when desired, I provide a lock-release key 154, Figs. 1 and 11, whose lower end is guided in a slot in a horizontal portion of the plate 142 and is provided with a stud 155, projecting laterally over the front end of the bar 141. Upon depressing the key 154 the front end of the bar 141 will be carried downward and its notch 145 be disengaged from the stud 146 upon the lower end of the lever 147, whereupon a spring 156, connected to said lever, will throw the upper ends of said lever and of the arm 149, Fig. 12, forward out of the path of the studs 150 on the bail 151, and thereby unlock the keys. A spring 157, connected to the release-key 154, returns the latter to its normal position when released.

The signal-bell 158 of the machine is secured to and carried by the depending vertical arm of an angle-plate 159, which is fastened at its upper horizontal end to a block or slide 160, fitting in and adapted to travel longitudinally of a slot or guideway 161 in the rear top plate of the machine, Figs. 1, 2, 2ᵇ, 3, and 4. The slide 160 does not project quite through the top of the slot or guideway 161, and it has screwed into its upper side a thumb-screw 162, by tightening which the parts may be clamped in adjusted position to the top plate of the frame. Projecting radially from the central screw-post, by which the bell is secured to its supporting-plate 159, is an arm 163, Fig. 2ᵇ, which carries a forwardly-projecting post or spindle 164, upon which is hung the hammer or striker 165. Coiled around the post 164 is a spring 166, secured at one end to the striker and at its opposite end to the post or the arm 163. This spring tends to throw the striker outwardly into contact with the bell, its movement in that direction being limited by contact with a stop-pin 167, projecting from the arm 163 beside the post 164. Hung upon the post 164 in front of the striker 165 is a bell-crank 168, whose horizontal arm carries a stud 169, projecting over the arm of the striker. The vertically-depending arm of this bell-crank 168 hangs in the path of travel of the extreme end of the pin 136 upon the paper-carriage heretofore described, Figs. 3 and 4, and as the paper-carriage travels toward the left the pin 136 will contact with the depending arm of the bell-crank 168 and swing it and the striker toward the left until the pin clears the lower end of the bell-crank arm, whereupon the spring 166 will throw the striker back to the right again into contact with the stop-pin 167, the resiliency of the spring-arm of the striker permitting its head to be carried onward into contact with the bell by momentum and retracting it slightly therefrom after such contact. At the return of the paper-carriage to the right the pin 136 will contact with the depending arm of the bell-crank 168 and swing it idly to the right until it clears it. A light spring 169ª, coiled around the outer end of the post 164 and connected to the bell-crank 168, yieldingly holds the latter in normal position, with its pin 169 bearing against the upper or right-hand end of the striker 165.

I do not claim herein any features shown and claimed in my application Serial No. 43,599, filed January 17, 1901, and of which this is a division, nor in my other divisional applications, Serial No. 57,797, filed April 27, 1901, and Serial No. 115,985, filed July 17, 1902.

Having thus fully described my invention, I claim—

1. In a type-writer, the combination of the transverse bars or rails 28 29 secured to the frame of the machine and provided with the V-shaped grooves in their opposing faces, the paper-carriage having the base-plate 31 located above said rails, and the antifriction-rollers 32 mounted upon vertically-depending studs upon the under side of said plate 31 and engaging the grooves in the rails 28 29, substantially as described.

2. In a type-writer, the combination of the transverse bars or rails 28 29 secured upon the frame of the machine and provided with the V-shaped grooves in their opposing faces, the paper-carriage having the base-plate 31 located above said rails, the studs projecting from the under side of said plate 31 and provided with the reduced lower portions forming the annular shoulders at the upper ends thereof, the antifriction-rollers 32 mounted upon said studs, with their upper sides bearing against said annular shoulders and their lower sides provided with depending hubs or sleeves terminating slightly above the lower ends of the studs, and the screws 35 screwed into the lower ends of the studs and confining the rollers 32 thereon, said rollers engaging the V-shaped grooves in the rails 28 29 and supporting the paper-carriage thereon, substantially as described.

3. In a type-writing escapement mechanism, the combination, with the escapement-rack, of a pair of pivoted levers having rigid escapement dogs or pallets alternately engaging the rack but incapable of movement with it, said dogs being so located in relation to the teeth of the rack that upon the downstroke of a key the rack will be permitted a slight movement intermediate the disengagement of one dog and the engagement of the other said slight movement being less than a one-half letter-space, for the purpose of preventing the normally engaged dog from reëngaging the same tooth of the rack upon the return of the dogs to normal position at the upstroke of the key, substantially as described.

4. In a type-writer escapement mechanism, the combination, with an escapement-rack extending longitudinally of the paper-carriage, of a pair of pivoted levers having rigid escapement-dogs alternately engaging the rack but incapable of movement with it and so set relatively to the teeth of the rack as to permit a slight movement of the rack upon the shifting of the dogs by the downstroke of a key, for the purpose of preventing the normally engaged dog from reëngaging the same tooth of the rack upon the return of the dogs to normal position at the upstroke of the key said slight movement being less than a one-half letter-space, substantially as described.

5. In a type-writer escapement mechanism, the combination, with an escapement-rack formed upon the opposite edges of a rack-bar secured to and extending longitudinally of the paper-carriage, of a pair of pivoted levers having rigid escapement dogs or pallets coöperating respectively with the teeth upon the opposite edges of said bar but incapable of movement therewith, said dogs being so located relatively to the teeth upon said bar as to permit a slight movement of the bar and paper-carriage upon the disengagement of one dog from one edge of the bar and the engagement of the other dog with the opposite edge thereof, at the downstroke of a key, for the purpose of preventing the first-mentioned dog from reëngaging the same tooth of the bar upon the return of the dogs to normal position at the upstroke of the key and means for adjusting the relative locations of said dogs, substantially as described.

6. In a type-writer escapement mechanism, the combination, with the rack-bar 38 secured to and extending longitudinally of the paper-carriage and provided with teeth upon its opposite edges, of a pivoted arm 40 provided with the dog 39 coöperating with the teeth upon one edge of the bar 38, the pivoted lever 44 provided with the dog 43 coöperating with the teeth upon the opposite edge of the bar 38, and connections between the arm 40 and lever 44 and the keys of the machine for vibrating said arm and lever in one direction at the downstroke of a key, to disengage the dog 39 from the rack-bar and engage the dog 43 therewith, and for reëngaging the dog 39 with the bar and disengaging the dog 43 therefrom at the upstroke of the key, the dogs 39 and 43 being so set relatively to the teeth of the rack-bar that the bar is permitted a slight movement intermediate the disengagement of the dog 39 and the engagement of the dog 43 therewith said slight movement being less than a one-half letter-space, substantially as and for the purpose described.

7. In a type-writer escapement mechanism, the combination, with the rack-bar 38 secured to and extending longitudinally of the paper-carriage and provided with teeth upon its opposite edges, of a pivoted arm 40 carrying the rigid dog 39 coöperating with one edge of the bar, the pivoted lever 44 carrying the rigid dog 43 coöperating with the opposite edge of the bar and having its inner end arranged to coöperate with the free end of the arm 40, the spring 42 connected to the arm 40, and a connection between the lever 44 and the keys of the machine for vibrating the lever in opposite directions at the downward and upward strokes of the keys, the dogs 39 and 43 being so located relatively to the teeth on the rack-bar as to permit a slight movement of said bar intermediate the disengagement of the dog 39 therefrom and the engagement of the dog 43 therewith and means for adjusting the relative locations of said dogs, substantially as and for the purpose described.

8. In a type-writer escapement mechanism, the combination, with the rack-bar 38, of the pivoted arm 40 provided with the dog 39 coöperating with the teeth upon the bar 38, connections between said arm and the keys for disengaging the dog from the rack, the spring 42 connected to the arm for reëngaging the dog with the rack, and the release-bar 60 coöperating with a projection 59 upon the arm 40 to hold the dog out of engagement with the rack when desired, an adjustable bracket 45, an arm pivoted thereon and having a dog 43 coöperating with said rack-bar, substantially as described.

9. In a type-writer escapement mechanism, the combination, with the rack-bar 38 secured to and extending longitudinally of the paper-carriage and provided with teeth upon its opposite edges, of the pivoted arm 40 provided with the dog 39 coöperating with teeth upon one edge of the bar 38, the lever 44 provided with the dog 43 coöperating with the opposite edge of the bar and having its inner end arranged to coöperate with the free end of the arm 40, the spring 42 connected to the arm 40, a connection between the lever 44 and the keys of the machine for vibrating the lever in opposite directions at the downward and upward strokes of the keys, and the release-bar 60 coöperating with the finger or projection 59 upon the arm 40, substantially as described.

10. In a type-writer, the combination of the paper-carriage frame, the rock-shaft 66 mounted therein, the arms 64 65 secured to and projecting upward from said rock-shaft, the platen-roller 63 journaled at its opposite ends in the arms 64 65, the vibrating rod 71, the circumferentially-grooved collar 70 mounted to slide longitudinally upon the rod 71, the arm 69 fastened at one end to the rock-shaft 66 and engaging the groove in the collar 70 at its opposite end, and means for vibrating the rod 71 to rock the shaft 66 and shift the platen-roller 63, substantially as described.

11. In a type-writer, the combination of the paper-carriage frame, the rock-shaft 66 mounted therein, the arms 64 65 secured to and projecting upward from said rock-shaft, the platen-roller 63 journaled at its opposite ends in the arms 64 65, the swinging bail composed of the rod 71 and the side arms 72 73 by which it is hung to the frame of the machine, one of said arms projecting horizontally from its pivotal support to constitute a bell-crank, the circumferentially-grooved collar 70 mounted to slide longitudinally upon the rod 71, the arm 69 fastened at one end to the rock-shaft 66 and engaging the groove in the collar at its opposite end, the lever 78 provided with a slot engaging the stud 77 upon the bell-crank, and the shift-key 79 for depressing the front end of said lever, substantially as described.

12. In a type-writer, the combination, with a platen-roller having a spindle, of a plurality of spring-pressed feed-rollers coöperating therewith, a pair of levers fulcrumed on the platen-roller spindle at the opposite ends of the platen-roller, a paper-release rod or bar carried by said levers for rocking the same, and connections between said levers and the feed-rollers for throwing the latter rollers away from the platen-roller by movement of the release rod or bar, substantially as described.

13. In a type-writer, the combination of the platen-roller 63 having a spindle, the paper-guide 97 extending around the lower and forward portion of said roller, the feed-rollers 85 86 engaging the platen-roller 63 at the front and rear sides of its lower portion through apertures in the paper-guide 97, the feed-roller 87 bearing against the upper forward side of the platen-roller, suitable movable supports for said rollers and springs for pressing the rollers against the platen-roller, the levers 94 95 fulcrumed on the platen-roller spindle at the opposite ends of the platen-roller, the paper-release rod or bar 96 carried by said levers, and connections between said levers and the supports for the feed-rollers 85 86 87 for disengaging said rollers from the platen-roller upon operating the paper-release rod 96, substantially as described.

14. In a type-writer, the combination of the platen-roller 63 mounted at its opposite ends in supports 64 65, the pairs of arms 88 89 pivoted at their inner ends to the supports 64 65, the feed-rollers 85 86 journaled in the opposite ends of said arms and coöperating with the platen-roller 63, the springs 91 for holding the feed-rollers in engagement with the platen-roller, the levers 94 95 mounted at the opposite ends of the platen-roller and carrying the paper-release rod 96, and the pairs of toggle-arms 93 pivoted at their free ends to the arms 88 89 at the opposite ends of the platen-roller and coöperating at their connected ends with the levers 94 95, substantially as and for the purpose described.

15. In a type-writer, the combination of the platen-roller 63 mounted at its opposite ends in supports 64 65, the pairs of arms 88 89 90 pivoted at their inner ends to said supports, the feed-rollers 85 86 87 journaled in the outer ends of said arm, the springs 91 92 for holding the feed-rollers against the platen-roller, the toggles 93, each pivoted at its free end to the arms 88 89 at one end of the platen-roller, and the levers 94 95 mounted at the opposite ends of the platen-roller and carrying the paper-release rod 96 and coöperating with the toggles 93 and with the arms 90 to separate the feed-rollers from the platen-roller when the release-rod 96 is operated, substantially as described.

16. In a type-writer, the combination, with the platen-roller, feed-rollers coöperating therewith, and a paper-release bar fulcrumed on the platen-roller spindle connected with the feed-rollers for separating them from the platen-roller, of a scale-bar coöperating with the platen-roller and movable toward the printing-line by operation of the paper-release bar to separate the feed-rollers from the platen-roller, substantially as described.

17. In a type-writer, the combination of the platen-roller 63 mounted at its opposite ends in supports 64 65, the arms 90 pivoted at their inner ends to the supports 64 65, the scale-bar 98 secured at its opposite ends to said arms, and the levers 94 95 mounted at the opposite ends of the platen and carrying the paper-release rod 96 and coöperating with the arms 90 to move the scale-bar 98 toward the printing-line upon the roller 63 when the rod 96 is operated to release the paper, substantially as described.

18. In a type-writer, the combination of the platen-roller 63 mounted at its opposite ends in supports 64 65, the feed-rollers 85 86 mounted in suitable supports and spring-pressed against the platen-roller 63, the arms 90 pivoted at their inner ends to the supports 64 65, the feed-roller 87 journaled in the outer ends of said arms 90 and the scale-bar 98 also secured at its opposite ends to the arms 90 in rear of the feed-roller 87, and the levers 94 95 mounted at the opposite ends of the platen and carrying the release-bar 96 and coöperating with the arms 90 and with the spring-pressed supports of the feed-rollers 85 86 to separate all of the feed-rollers from the platen-roller and move the scale-bar toward the printing-line upon the platen-roller, substantially as described.

19. In a type-writer, the combination, with the platen-roller and ratchet, the line-spacing lever and pawl coöperating therewith to turn the roller, and a fixed stop for limiting the movement of the lever in one direction, of a disk mounted to turn upon the spindle of the platen-roller and carrying a stop for limiting the movement of the lever in the opposite direction, and means for turning said disk and locking it in different positions to adjust the stop carried by it and correspondingly limit the movements of the lever, substantially as described.

20. In a type-writer, the combination of the platen-roller 63 having its spindle 62 mounted in supports 64 65 at the opposite ends of the roller, the ratchet 103 fast upon said spindle, the lever 101 carrying a pawl 102 engaging said ratchet, the tubular stop 109, the spring 104 normally holding the lever 101 against said stop, the disk 105 turning loosely upon the spindle 62 and carrying the stop-rod 106 and provided with the series of holes 107, and the spring-pressed sliding catch-pin 108 mounted in the tubular stop 109 and coöperating with the holes of the disk 105, substantially as described.

21. In a type-writer, the combination, with the platen-roller 63 having its spindle 62 mounted in supports 64 65 at the opposite ends of the roller, of a toothed alining-wheel 112 secured to said spindle at one end of the roller, the spring-pressed arm 114 carrying the roller 113 engaging the toothed wheel 112, and the sliding disengaging-piece 115 mounted upon the support 64 and coöperating with the spring-pressed arm 114 to disengage the roller 113 from the wheel 112, substantially as described.

22. In a type-writer, the combination, with the frame-plate having the longitudinal slot or guideway 120, and the ratchet-bar 124 adjacent said guideway, of the marginal stop 119 mounted to travel in said guideway, and the spring-pressed pin 121 journaled in said stop and carrying at its upper end the thumb-piece 122 for turning it and at its lower end the toothed arm or catch-piece 123 coöperating with the ratchet-bar 124, said marginal stop being adapted to coöperate with a stop projection 118$^a$ upon the paper-carriage, substantially as described.

23. In a type-writer, the combination of the rock-shaft 132, an automatic locking device for the keys of the machine operated by the rocking of said shaft, a sleeve 131 adjustable longitudinally of said shaft, and an arm or finger projecting from said sleeve into the path of a projection upon the paper-carriage, whereby when said carriage reaches a given point in its travel toward the left the shaft 132 will be rocked and the keys of the machine become automatically locked from further operation, substantially as described.

24. In a type-writer, the combination of the rock-shaft 132, the sleeve 131 mounted to slide thereon and having the projecting arm or finger 133, the hollow stem 128 projecting upward from said sleeve through a slot in the frame-plate and carrying a pointer coöperating with the scale-bar, the set-screw 129 passing through the stem 128 and engaging the rock-shaft 132 to lock the sleeve 131 in position thereon, an automatic locking device for the keys of the machine operated by the rocking of the shaft 132, and the paper-carriage provided with the trip projection 135 coöperating with the arm or finger 133 to rock the shaft 132 and lock the keys, substantially as described.

25. In a type-writer, the combination, with the bail 151 153 underlying the type-keys, of the locking-lever 147 coöperating therewith, the bar 141 provided with the notch 145 coöperating with the stud 146 on the lower end of the lever 147, means coöperating with the bar 141 to move it longitudinally at a predetermined point in the movement of the paper-carriage, to swing the lever 147 into position to lock the bail, the lock-release key 154 for depressing the front end of the bar 141 and disengaging its notch 145 from the stud 146 on the lever 147, and the spring 156 for restoring the lever 147 to normal position when so released and thereby unlocking the bail and type-keys, substantially as described.

26. In a type-writer, the combination, with the paper-carriage provided with a bell-trip, of the bell 158, the radial arm 163 secured within the bell, the post 164 secured to and projecting from the arm 163, the striker 165 hung upon the post 164, the coiled spring 166 operating to yieldingly hold said striker in normal position against a stop-pin 167 projecting from the arm 163, and the bell-crank 168 hung upon the post 164 and having one arm depending into the path of the trip upon the paper-carriage and its other arm provided with a projection coöperating with the striker 165, substantially as described.

27. In a type-writer, the combination, with the frame-plate provided with the slot or guideway 161, of the block or slide 160 fitting in said guideway, the angle-plate 159 having its horizontal upper end secured to the under side of said block, the thumb-screw 162 screwed into the upper side of said block and provided with a flange adapted to bear upon the frame-plate at the opposite sides of the guideway and clamp the parts thereto, the signal-bell 158 secured to the vertical arm of the angle-plate 159 and the paper-carriage provided with a trip coöperating with the bell-striker, substantially as described.

JASON C. LOTTERHAND.

Witnesses:
PERCY E. MATTOCKS,
EDMUND S. SNEWIN.